(12) United States Patent
Choi

(10) Patent No.: US 11,491,872 B2
(45) Date of Patent: Nov. 8, 2022

(54) VEHICLE AND METHOD FOR DISPLAYING AN IMAGE ONTO A WINDSHIELD

(71) Applicants: HYUNDAI MOTOR COMPANY, Seoul (KR); KIA MOTORS CORPORATION, Seoul (KR)

(72) Inventor: Young Jin Choi, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 431 days.

(21) Appl. No.: 16/743,924

(22) Filed: Jan. 15, 2020

(65) Prior Publication Data
US 2021/0031625 A1 Feb. 4, 2021

(30) Foreign Application Priority Data
Aug. 2, 2019 (KR) .......... 10-2019-0094137

(51) Int. Cl.
| | | |
|---|---|---|
| G06F 7/00 | (2006.01) | |
| B60K 35/00 | (2006.01) | |
| G02B 27/01 | (2006.01) | |
| G02B 27/00 | (2006.01) | |
| B60R 11/04 | (2006.01) | |

(52) U.S. Cl.
CPC ............. *B60K 35/00* (2013.01); *B60R 11/04* (2013.01); *G02B 27/0093* (2013.01); *G02B 27/0101* (2013.01); *B60R 2300/308* (2013.01); *B60R 2300/802* (2013.01); *G02B 2027/0141* (2013.01); *G02B 2027/0196* (2013.01)

(58) Field of Classification Search
CPC ..... B60K 35/00; B60R 11/04; G02B 27/0093; G02B 27/0101
USPC .......................................................... 701/36
See application file for complete search history.

(56) References Cited

U.S. PATENT DOCUMENTS

| | | | | |
|---|---|---|---|---|
| 2016/0054564 | A1* | 2/2016 | Han | G02B 27/0149 349/11 |
| 2016/0101734 | A1* | 4/2016 | Baek | B60R 11/04 348/148 |
| 2016/0311323 | A1* | 10/2016 | Lee | B60K 37/06 |
| 2018/0166047 | A1* | 6/2018 | Yamazato | G02B 27/01 |
| 2020/0023831 | A1* | 1/2020 | Dawson | B60W 40/02 |

FOREIGN PATENT DOCUMENTS

| | | |
|---|---|---|
| KR | 10-2015-0044346 A | 5/2015 |
| KR | 10-2017-0126149 A | 11/2017 |

* cited by examiner

*Primary Examiner* — Jonathan M Blancha
(74) *Attorney, Agent, or Firm* — Slater Matsil, LLP

(57) ABSTRACT

A vehicle and a method for controlling the vehicle are provided. The vehicle includes a first camera configured to capture a front image of the vehicle; a head-up display configured to project an image onto a windshield of the vehicle; an input device configured to input a boundary line for setting an area in which the image is projected from the windshield; and a controller configured to determine a projection area in which the image is projected based on the inputted boundary line, to determine an interest area of the front image based on the determined projection area and a speed of the vehicle, and to display the determined interest area in the determined projection area on the head-up display.

18 Claims, 8 Drawing Sheets

0km/h

5km/h

0km/h

5km/h

VEHICLE AND METHOD FOR DISPLAYING AN IMAGE ONTO A WINDSHIELD

CROSS-REFERENCE TO RELATED APPLICATION

The present application claims priority to and the benefit of Korean Patent Application No. 10-2019-0094137, filed on Aug. 2, 2019, which is incorporated herein by reference in its entirety.

TECHNICAL FIELD

The present disclosure relates to a vehicle and a method of controlling the vehicle for projecting a blind spot image in front of the vehicle onto a windshield using a head up display (HUD).

BACKGROUND

The statements in this section merely provide background information related to the present disclosure and may not constitute prior art.

Recently, a technology for displaying an image of the front of the vehicle on an AVN device by installing a front camera on the vehicle so that a driver can secure a view in front of the vehicle has been developed. However, since the driver needs to bow down to identify the image displayed on the AVN device, there is a problem that the driver cannot identify the pedestrians coming from the side when the driver identifies the forward image. In addition, since the driver cannot accurately determine the distance between the vehicle and the front object by identifying the image displayed on the AVN device, the driver may feel anxiety as compared with the driver directly looking ahead and judging.

SUMMARY

The present disclosure provides a vehicle and a method of controlling the same, which secure a view in front of the vehicle obscured by a bonnet of the vehicle and display it on a head up display (HUD).

In one form of the present disclosure, a vehicle may comprise a front camera configured to photograph a front of the vehicle; a head-up display configured to project an image onto a windshield of the vehicle; an input device configured to accept input a boundary line for setting an area in which the image is projected from the area of the windshield; and a controller configured to determine a projection area in which the image is projected based on the inputted boundary line, to determine an interest area of the front image photographed from the front camera based on the determined projection area and the speed of the vehicle, and to control the head-up display so that the determined interest area is displayed in the determined projection area.

The controller may determine a size of the interest area in proportion to the size of the projection area.

The controller may raise the position of the interest area when the speed of the vehicle increases, and may lower the position of the interest area when the speed of the vehicle decreases.

The controller may move the position of the interest area in a steering direction of the vehicle.

The controller may lower the position of the interest area as a vehicle body angle of the vehicle relative to a horizontal line is increased.

In addition, the vehicle in some forms of the present disclosure may further include an internal camera configured to acquire a face image of the driver, and the controller may determine the position of the driver's eye based on the face image of the driver and determine a size of the projection area in which the front image is projected based on the position of the eye.

The controller may control the head-up display so that the interest area is not displayed in the projection area when the speed of the vehicle is greater than or equal to a predetermined speed.

The controller may determine an area between a lower end portion of the windshield and the boundary line as the projection area.

The input device may be provided in the windshield.

The controller may determine a photographing angle of the front camera based on at least one of a speed of the vehicle, a steering direction of the vehicle, or a vehicle body angle of the vehicle relative to a horizontal line, and adjust the photographing angle of the front camera based on the determined photographing angle.

In another form of the present disclosure, a method for controlling a vehicle comprising: photographing a front of the vehicle by a front camera; accepting input a boundary line for setting an area in which an image is projected from an area of a windshield of the vehicle; determining a projection area on which the image is projected based on the inputted boundary line; determining an interest area of the front image photographed from the front camera based on the determined projection area and the speed of the vehicle; and displaying the determined interest area on the determined projection area.

The determining of the interest area of the front image based on the determined projection area may include determining a size of the interest area in proportion to the size of the projection area.

The determining of the interest area of the front image based on the speed of the vehicle may include raising the position of the interest area when the speed of the vehicle increases, and lowering the position of the interest area when the speed of the vehicle decreases.

The method for controlling a vehicle of the vehicle in some forms of the present disclosure may further include moving the position of the interest area in a steering direction of the vehicle.

The method for controlling a vehicle of the vehicle according to an form may further include lowering the position of the interest area as a vehicle body angle of the vehicle relative to a horizontal line is increased.

The method for controlling a vehicle in some forms of the present disclosure may further include acquiring a face image of a driver; determining a position of the driver's eyes based on the face image of the driver; and determining a size of a projection area in which the front image is projected based on the position of the eye.

The method for controlling a vehicle of the vehicle in some forms of the present disclosure may further include not displaying the interest area in the projection area when the speed of the vehicle is greater than or equal to a predetermined speed.

The determining of the projection area on which the image is projected based on the inputted boundary line may include determining an area between a lower end portion of the windshield and the boundary line as the projection area.

The accepting input a boundary line for setting an area in which the image is projected from the area of the windshield of the vehicle may be performed by an input device provided in the windshield of the vehicle.

In addition, the method for controlling a vehicle in some forms of the present disclosure, may further including: determining the photographing angle of the front camera based on at least one of a speed of the vehicle, a steering direction of the vehicle or a vehicle body angle of the vehicle relative to a horizontal line; and adjusting a photographing angle of the front camera based on the determined photographing angle.

In some forms of the present disclosure, a vehicle and the method of controlling the vehicle can improve driver safety and provide stability to the driver since the driver can directly check the blind spot in front of the vehicle without bowing down.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
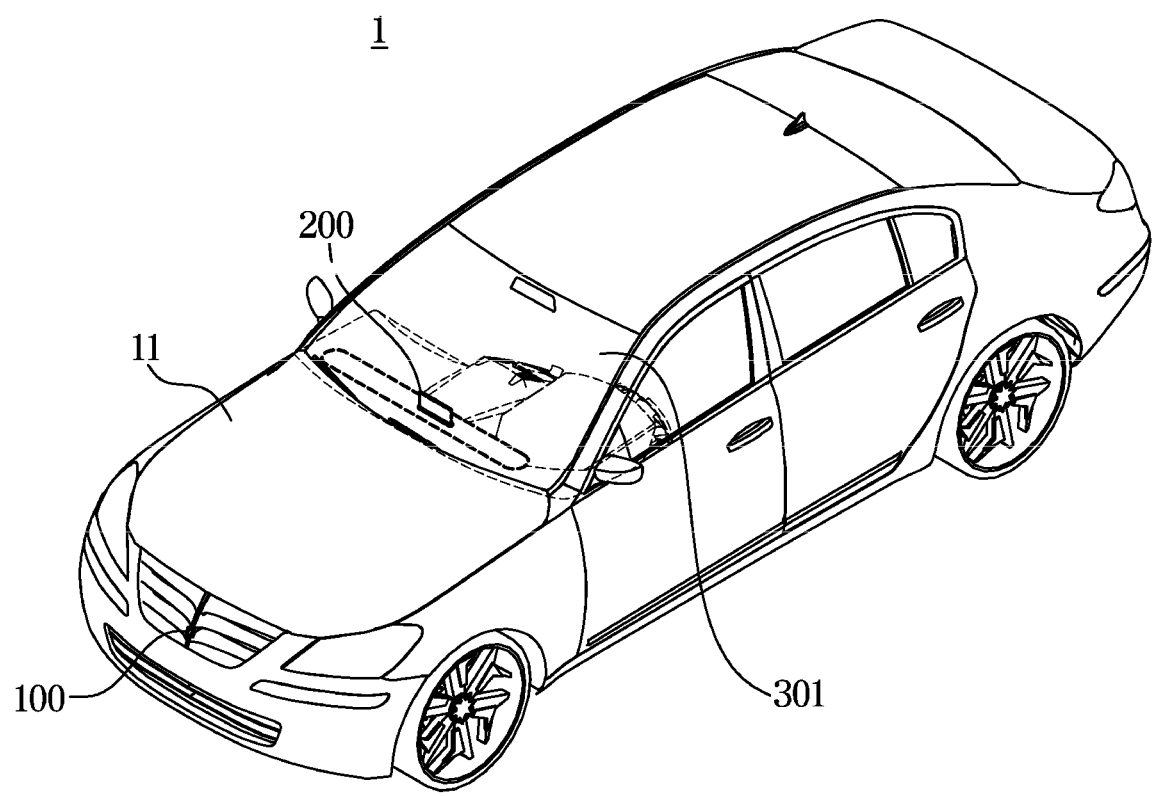
FIG. 1 is a perspective view schematically illustrating an exterior of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be further understood that the term "connect" or its derivatives refer both to direct and indirect connection, and the indirect connection includes a connection over a wireless communication network.

Singular expressions include plural expressions unless the context clearly indicates an exception.

The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

Reference numerals used for method steps are just used for convenience of explanation, but not to limit an order of the steps. Thus, unless the context clearly dictates otherwise, the written order may be practiced otherwise.

Hereinafter, in some forms of the present disclosure a vehicle 1 and a method for controlling thereof according to an aspect will be described in detail with reference to the accompanying drawings.

Figure 2:
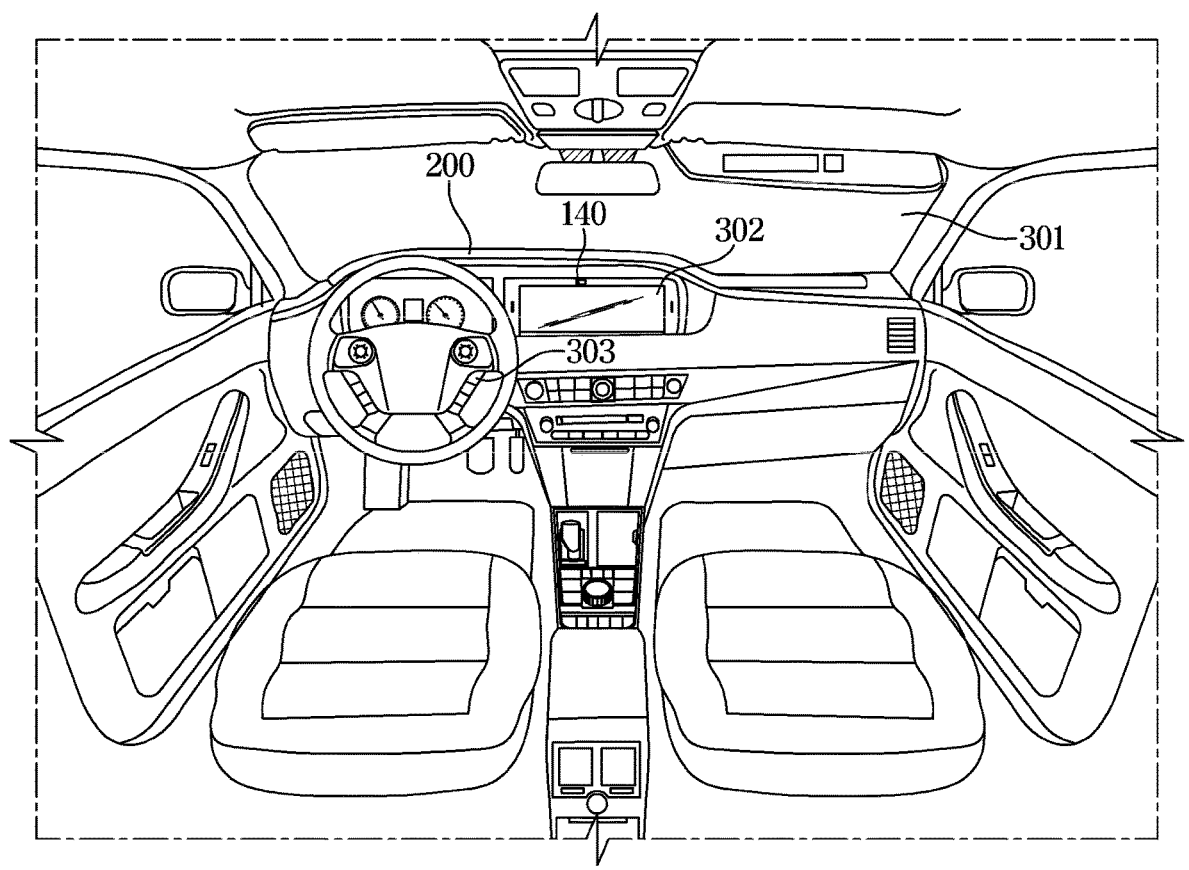
FIG. 2 is a view illustrating an interior of a vehicle in one form of the present disclosure.

FIG. 1 is a perspective view schematically illustrating an exterior of a vehicle in some forms of the present disclosure, and FIG. 2 is a view illustrating an interior of a vehicle in some forms of the present disclosure.

Referring to FIGS. 1 and 2, the vehicle 1 may be provided with a bonnet 11 configured to protect various devices required for driving the vehicle 1, such as an engine, and a windshield 301 configured to provide a view in front of the vehicle 1.

In addition, the vehicle 1 may be provided with a head-up display 200 provided on the lower dashboard of the windshield 301 to project an image onto the windshield 301. The head-up display 200 may be provided at the lower end portion of the windshield 301 to project various images on the windshield 301 so that the driver may identify various information without bowing his head.

In detail, the head-up display 200 may be received within the upper panel of the dash board, and may be provided to be deployed in the driver's gaze direction of sight when necessary.

In some forms of the present disclosure, the head-up display 200 may be received between the upper panel and an air conditioning duct. The air conditioning duct may mean a passage for introducing air into the interior of the vehicle 1 in order to comfortably maintain the interior of the vehicle 1.

In general, a predetermined space may be formed between the air conditioning duct and the upper panel. Head-up display 200 in some forms of the present disclosure can use the structure of the existing vehicle 1 by installing in the space between the air conditioning duct and the upper panel, the cost and effort for forming a separate space for installing the head-up display 200 may be reduced.

In addition, the head-up display 200 may include an image output part and a mirror for outputting an image, and the mirror may reflect the image output from the image output unit to the windshield 301 as a plane mirror, thereby the image reflected from the mirror may be projected on the windshield 301 to provide at the driver's eye level. In addition, the head-up display 200 may output an image such that the image is displayed in the projection area from the area of the windshield 301.

In addition, the vehicle 1 may be provided with a front camera 100 that can capture a front image to obtain a front image and an internal camera 140 for acquiring a face image of the driver.

For example, the front camera 100 may be installed at a part of the radiator grill, for example, inside, and may be installed in any position where images of the front of the vehicle 1 can be acquired. In addition, the internal camera 140 may be installed inside the vehicle 1 and may be installed above the AVN device 302 as an example. The internal camera 140 may be installed in any position where the driver's facial images can be acquired.

Figure 3:
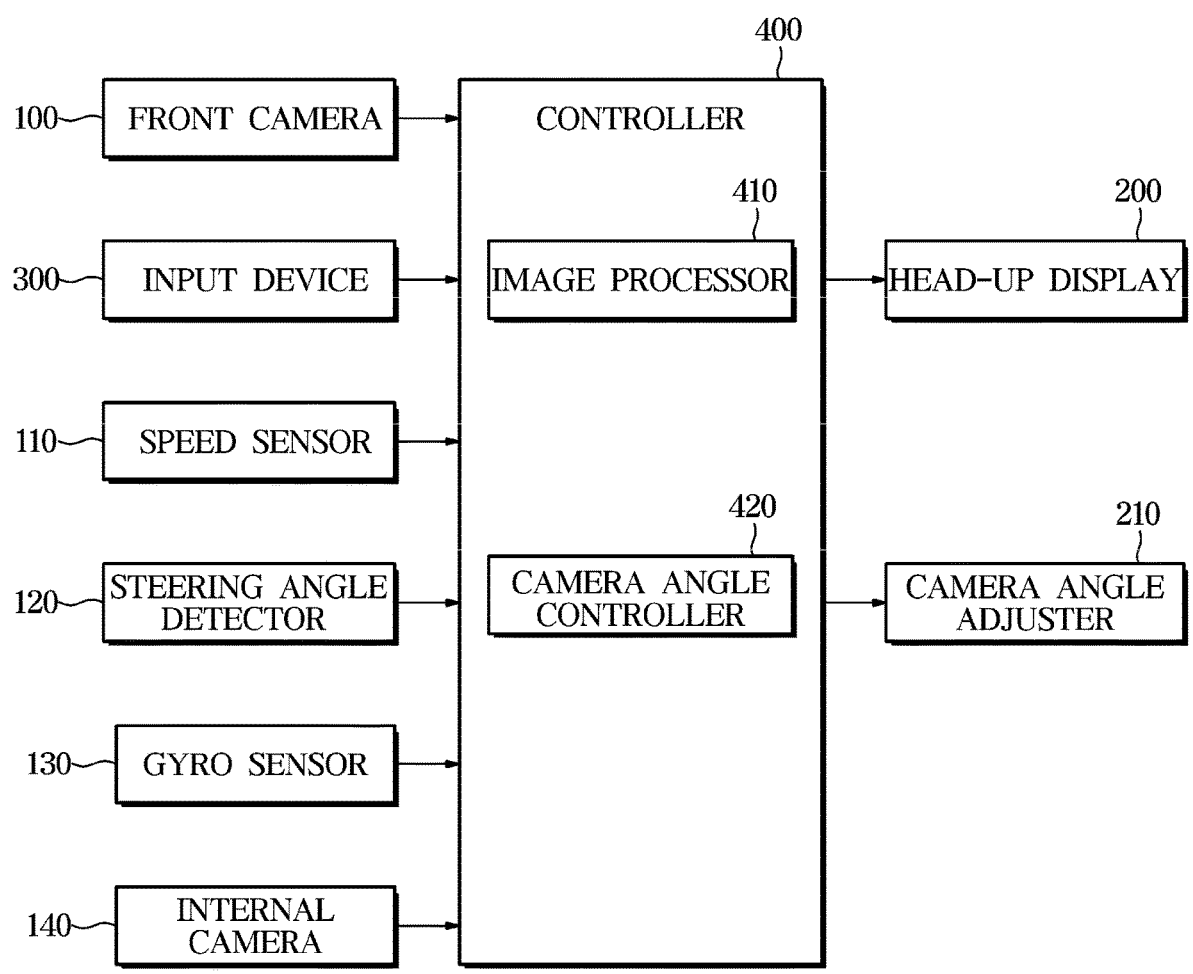
FIG. 3 is a control block diagram of a vehicle in one form of the present disclosure.

FIG. 3 is a control block diagram of a vehicle in some forms of the present disclosure.

Referring to FIG. 3, the vehicle 1 may include a front camera 100 configured to photograph the front of the vehicle 1; an input device 300 configured to input a boundary line for setting an area in which the image is projected from the area of the windshield 301; a speed sensor 110 configured to detect a speed of the vehicle 1; a steering angle detector 120 configured to detect a steering angle of the steering wheel; a gyro sensor 130 configured to detect a vehicle body angle of the vehicle 1 relative to a horizontal line; and an internal camera configured to obtain a face image of the driver.

In addition, the vehicle 1 may include a controller 400 that determines a projection area in which an image is projected based on a boundary line input from the input device 300, determines an interest area of the front image photographed from the front camera 100 based on the determined projection area and the speed of the vehicle 1, and controls the head-up display 200 to display the determined interest area in the determined projection area.

In addition, the vehicle 1 may include the head-up display 200 for projecting an image onto the windshield 301 of the vehicle 1 according to the control of the controller 400, and a camera angle adjuster 210 for adjusting the photographing angle of the front camera 100.

The front camera 100 and the internal camera 140 may include a plurality of lenses and an image sensor. The image sensor may include a plurality of photodiodes for converting light into an electrical signal, and the plurality of photodiodes may be arranged in a two-dimensional matrix.

The lens used for the front camera 100 may be a normal lens, a wide-angle lens having a viewing angle larger than the normal lens, or may be a fisheye lens which is an ultra wide-angle lens having a viewing angle greater than 180 degrees. However, it is preferable that the lens used for the front camera 100 is a wide angle lens having a viewing angle of 180 degrees.

The input device 300 may include all components that accept input various commands related to the control of the vehicle 1. In detail, the input device 300 may include an AVN device 302 inside the vehicle 1, a button 303 provided on the steering wheel, and a touch screen provided on the windshield 301. That is, the input device 300 may be provided in the windshield 301, and the input device 300 includes a concept including all of configurations for accepting input a user's command.

The speed sensor 110 may detect the driving speed of the vehicle 1 that the driver drives under the control of the controller 400. That is, the driving speed can be detected using the speed at which the wheel of the vehicle 1 rotates, and the driving speed may be represented in [kph], and may be represented by the distance (km) traveled per unit time (h).

The steering angle detector 120 may detect a steering angle that is a rotation angle of the steering wheel while the vehicle 1 is driving. That is, the steering angle detector 120 may be an angle sensor provided in the steering wheel.

The gyro sensor 130 may be provided in the vehicle 1 to measure the angular velocity of the vehicle 1.

The inclination of the vehicle body of the vehicle 1 relative to the horizontal line may be detected using the gyro sensor 130.

For example, when the vehicle 1 is in a horizontal state, the angular velocity is measured at 0 degrees/s, and when the vehicle 1 is tilted by 50 degrees while moving for 10 seconds, the average angular velocity over 10 seconds can be measured at 5 degrees/sec. The gyro sensor 130 may be replaced with a tilt sensor, and the tilt sensor may also detect a tilt of the vehicle body of the vehicle 1 based on a horizontal line.

Information or signals acquired from the front camera 100, the input device 300, the speed sensor 110, the steering angle detector 120, the gyro sensor 130, and the internal camera in some forms of the present disclosure may be transmitted to the controller 400.

In this case, a signal may be transmitted using a controller area network (CAN) communication system.

That is, in order to control various electric loads mounted on the vehicle 1 and to communicate between various electric loads, a communication network including a body network, a multimedia network, a chassis network, and the like is configured in the vehicle 1, and each of the networks separated from each other may be connected by the controller 400 to transmit and receive a mutual controller area network (CAN) communication message.

The controller 400 may include an image processor 410 for processing front image data so that the front image acquired from the front camera 100 may be output to the head-up display 200. The image processor 410 may determine an interest area of the front image and edit the front image to output the interest area on the head-up display 200. A detailed description will be described below with reference to FIG. 7.

In addition, the controller 400 may include a camera angle controller 420 that adjusts a photographing angle of the front camera 100 by changing a direction in which the front camera 100 photographs. The camera angle controller 420 may determine the photographing angle of the front camera 100 and adjust the photographing angle of the front camera 100 based on the determined photographing angle. A detailed description will be described below with reference to FIG. 8.

The controller 400 may be implemented as a memory (not shown) that stores data for an algorithm for controlling the operation of components in the vehicle 1 or a program reproducing the algorithm, and a processor (not shown) that performs the above-described operation using data stored in the memory.

In this case, the memory and the processor may be implemented as separate chips. Alternatively, the memory and the processor may be implemented in a single chip. In addition, the controller 400 may transmit a signal to an electronic control unit (ECU) or a terminal. In this case, a signal may be transmitted using a controller area network (CAN) communication system.

The head-up display 200 may output an image according to a control signal of the controller 400 to project the image onto the windshield 301 of the vehicle 1. In detail, the head-up display 200 may output an image such that the image is projected on the projection area from the area of the windshield 301.

The camera angle adjuster 210 may include a first gear 106 that rotates according to a control signal of the camera angle controller 420, and a second gear 105 having gear tooth engaged with the gear tooth of the first gear 106 and provided with the front camera 100.

That is, the camera angle adjuster 210 may adjust the photographing angle of the front camera 100 by adjusting the photographing direction of the front camera 100 according to the control signal of the controller 400.

The camera angle adjuster 210 may include any structure capable of adjusting the photographing direction of the camera, without being limited to the term.

Hereinafter, the vehicle 1 and the method of controlling the vehicle 1 in some forms of the present disclosure will be described with reference to FIGS. 5 to 8 to describe in detail.

Figure 4:
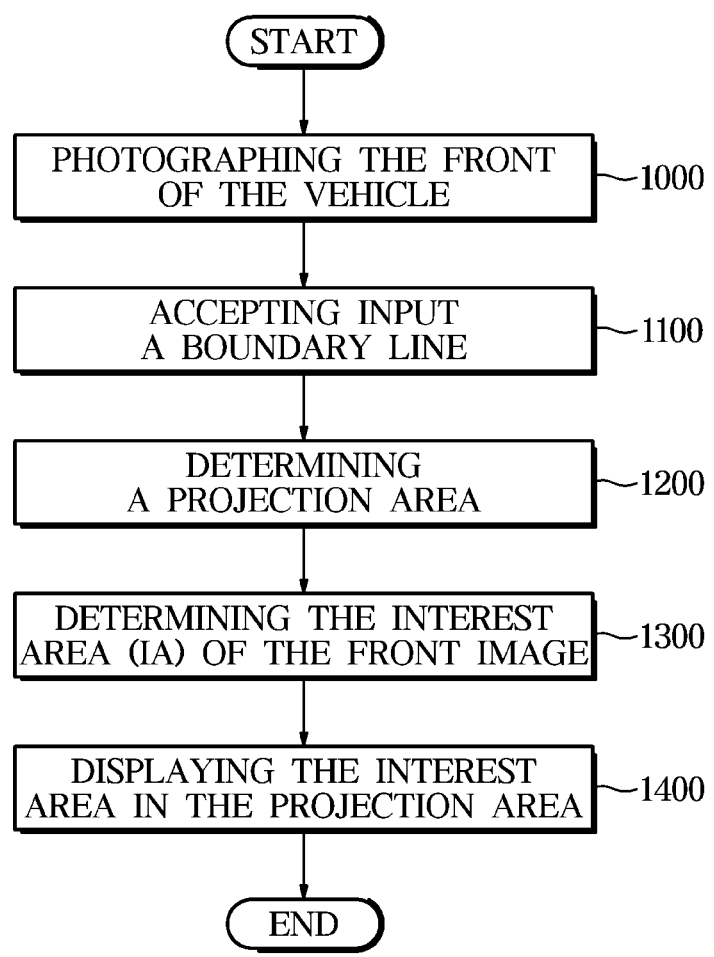
FIG. 4 is a flowchart illustrating a method for controlling a vehicle in one form of the present disclosure.
Figure 5:
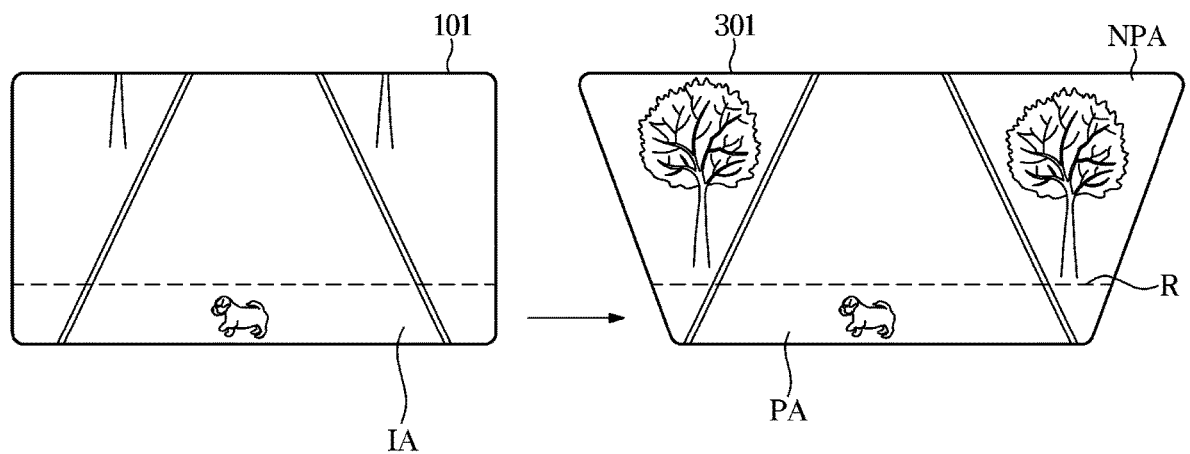
FIG. 5 is a view for describing a projection area of a vehicle in one form of the present disclosure.
Figure 6:
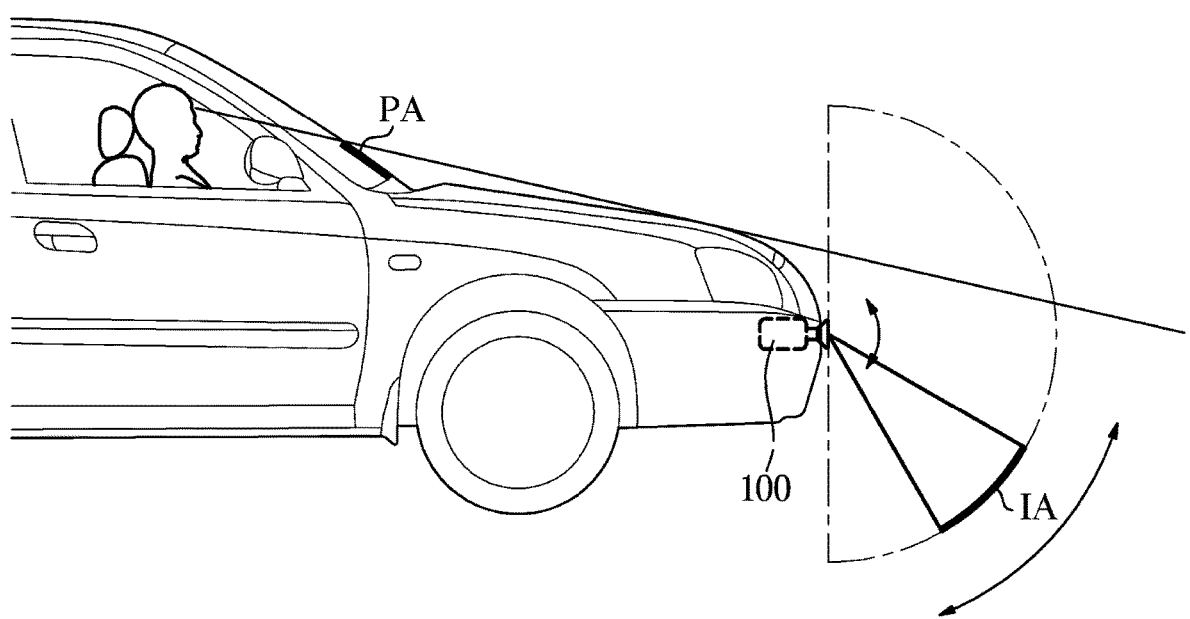
FIG. 6 is a side view of a projection area of a vehicle in one form of the present disclosure.
Figure 7:
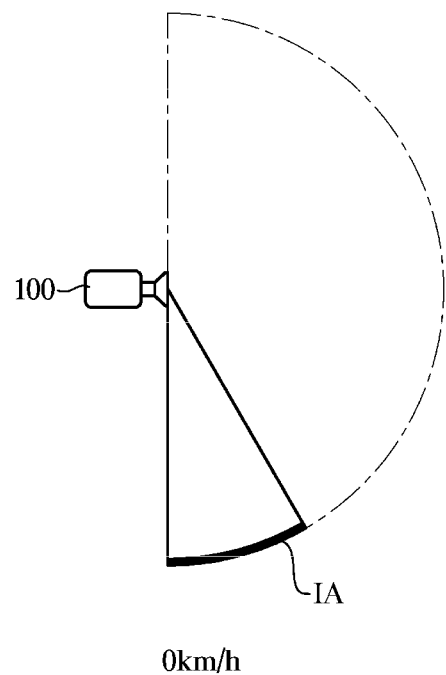
FIG. 7 is a view for describing a front image edited according to a speed of a vehicle in one form of the present disclosure.
Figure 7:
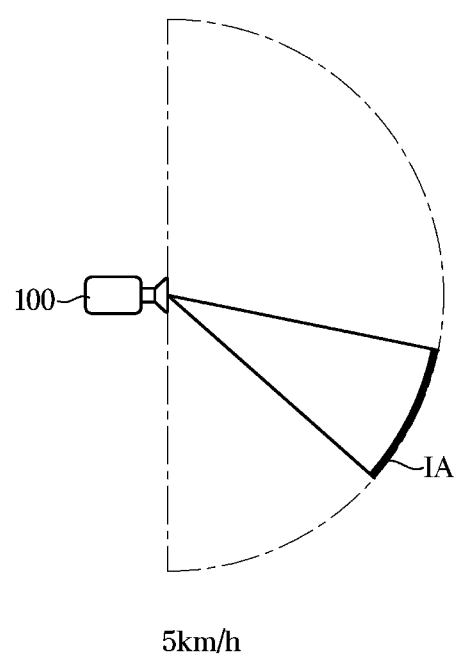
Figure 8:
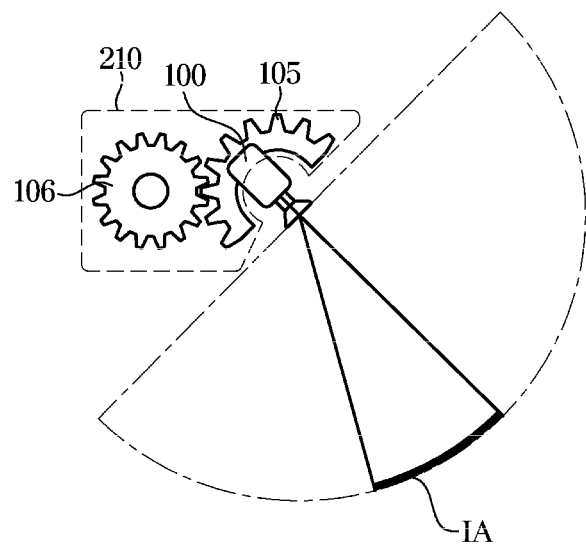
FIG. 8 is a view for describing a photographing angle of a camera changed according to a speed of a vehicle in one form of the present disclosure.
Figure 8:
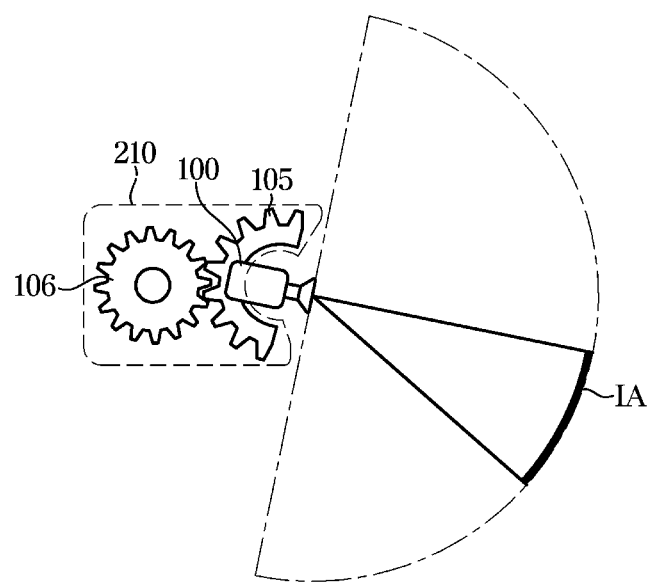

FIG. 4 is a flowchart illustrating a method for controlling a vehicle in some forms of the present disclosure, FIG. 5 is a view for describing a projection area of a vehicle in some forms of the present disclosure, FIG. 6 is a side view of a projection area of a vehicle in some forms of the present disclosure, FIG. 7 is a view for describing a front image edited according to a speed of a vehicle in some forms of the present disclosure, and FIG. 8 is a view for describing a photographing angle of a camera changed according to a speed of a vehicle in some forms of the present disclosure.

The front camera 100 may acquire the front image 101 by photographing the front of the vehicle 1 (1000). In this case, the front image may include an image of a blind spot in front of the vehicle 1 which the driver cannot see. The input device 300 may accept input a boundary line R for setting an area in which the image is projected from the area of the windshield 301 (1100). In this case, the driver may input the boundary line R using the touch screen provided in the windshield 301.

The controller 400 may determine a projection area PA in which an image is projected based on the inputted boundary line R (1200). In detail, when the boundary line R is input, the controller 400 may determine a region between the lower end portion of the windshield 301 and the boundary line R as the projection area.

That is, the interest area IA of the image output from the head-up display 200 is displayed in the projection area PA from the area of the windshield 301, and nothing is displayed in the area NPA that is not the projection area.

The controller 400 may determine the interest area IA of the front image 101 photographed by the front camera 100 based on the projection area PA and the speed of the vehicle 1 (1300). In detail, referring to FIG. 5, the controller 400 may determine the size of the interest area IA in proportion to the size of the projection area PA. That is, the controller 400 may determine the size of the interest area IA larger as the projection area PA is larger, so that the interest area IA is displayed on all portions of the projection area PA.

Referring to 6, the controller 400 may raise the position of the interest area IA when the speed of the vehicle 1 increases and may lower the position of the interest area IA when the speed of the vehicle 1 decreases, This is to prevent the collision with the object that may occur when the vehicle 1 moves by allowing the driver to identify the object located in the front lower blind spot close to the vehicle 1 as the speed of the vehicle 1 is slower.

In addition, this is to prevent the collision with the object that may occur when the vehicle 1 moves by allowing the driver to identify the object located in the lower blind spot far ahead of the vehicle 1 as the speed of the vehicle 1 is faster. This will be described below with reference to FIG. 7.

The controller 400 may raise the photographing angle of the front camera 100 when the speed of the vehicle 1 increases, and may lower the photographing angle of the front camera 100 when the speed of the vehicle 1 decreases. This will be described below with reference to FIG. 8.

Referring to FIG. 7, the front camera 100 in some forms of the present disclosure may have a viewing angle of 180 degrees. Therefore, the front image 101 acquired by the front camera 100 may include images of all regions corresponding to 180 degrees in front of the vehicle 1. When the vehicle 1 is in a stopped state, the bottommost portion of the image 101 acquired by the front camera 100 may be determined as the interest area IA. Also, when the vehicle 1 is driving at 5 km/h, the interest area IA may be upward.

Referring to FIG. 8, the front camera 100 in some forms of the present disclosure may be provided in the camera angle adjuster 210 so that a photographing angle may be changed. Specifically, the first gear 106 included in the camera angle adjuster 210 rotates according to the control signal of the controller 400, and the second gear 105 to which the front camera 100 is attached may rotate in accordance with the rotation of the first gear 106 to adjust the photographing angle of the camera. At this time, the camera angle adjuster 210 may include a hinge structure.

That is, the controller 400 may determine the photographing angle of the front camera 100 based on the speed of the vehicle 1, and may transmit a control signal for adjusting the photographing angle of the front camera 100 to the camera angle adjuster 210 based on the determined photographing angle. For example, when the vehicle 1 is in a stopped state, the photographing angle of the front camera 100 may be lowered, and when the vehicle 1 is driving at 5 km/h, the photographing angle of the front camera 100 may be raised.

When the photographing angle of the camera is adjusted in this way, the interest area IA of the front image may be located at the center of the front image, and the size of the interest area IA may be determined based on the determined projection area PA as described above.

Thereafter, the controller 400 may control the head-up display 200 to display the interest area IA in the projection area PA (1400).

In this case, when the speed of the vehicle 1 is greater than or equal to a predetermined speed, the controller 400 may control the head-up display 200 such that the interest area IA is not displayed in the projection area PA.

This is because the driver does not need to check the blind spot in front of the vehicle 1 when the speed of the vehicle 1 is somewhat high so that the front image 101 projected onto the windshield 301 may interfere with the driver's view.

Although not shown in the drawing, the controller 400 may move the position of the interest area IA in the steering direction of the vehicle 1.

For example, when the steering direction of the vehicle 1 is left, the position of the interest area IA may be determined to be biased to the left. In this case, the controller 400 may adjust the photographing angle of the front camera 100 to the left while maintaining the interest area IA at the center of the front image 101 in some forms of the present disclosure.

In addition, the controller 400 may lower the position of the interest area IA as the vehicle body angle of the vehicle 1 base on the horizontal line is greater. This is because when the vehicle 1 goes uphill, the body angle of the vehicle 1 based on the horizontal line becomes larger, and the blind spot that the driver cannot see becomes larger, so that the driver can lower the interest area IA to effectively provide the driver with a view of the blind spot.

Similarly, the controller 400 may lower the photographing angle of the camera while maintaining the interest area at the center of the front image as the vehicle body angle increases in some forms of the present disclosure.

In addition, the controller 400 may determine the position of the driver's eyes based on the driver's face image acquired from the internal camera 140, and may determine the size of the projection area PA on which the front image is projected based on the position of the eyes.

In detail, the controller 400 may determine the projection area PA based on a line connecting the driver's eyes and the bonnet of the vehicle 1. Referring to FIG. 6, as the position of the driver's eyes is higher, the size of the projection area PA may be smaller, and as the position of the driver's eyes is lower, the size of the projection area PA may be larger.

According to the vehicle 1 and the method for controlling the vehicle 1 in some forms of the present disclosure, the driver can directly secure the field of view of the blind spots in front of the vehicle 1 through the windshield 301, thereby feeling a sense of stability. In addition, since the driver may identify the object located in the blind spot without having to bow down, the collision with the object located in the blind spot can be prevented.

An example of the vehicle 1 and the method for controlling of the vehicle 1 are not limited thereto, and some forms of the present disclosure described above are exemplary in all respects. Therefore, it will be understood by those skilled in the art that the present disclosure may be implemented in other specific forms without changing the technical spirit or essential features thereof.

The scope of the present disclosure is shown not in the above description but in the claims, and all differences within the scope will be construed as being included in the present disclosure.

Meanwhile, some forms of the present disclosure may be embodied in the form of a recording medium storing instructions executable by a computer. The instructions may be stored in the form of program code and, when executed by a processor, may generate a program module to perform the operations of some forms of the present disclosure. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
    a first camera configured to capture a front image of the vehicle;
    a second camera configured to capture a face image of a driver;
    a head-up display configured to project an image onto a windshield of the vehicle;
    an input device configured to input a boundary line for setting an area in which the image is projected from the windshield; and
    a controller configured to:
        determine a position of eyes of the driver based on the face image of the driver;
        determine a projection area in which the image is projected based on the inputted boundary line;
        determine an interest area of the front image based on the determined projection area and a speed of the vehicle;
        determine a size of the projection area such that the size of the projection area is larger the higher the position of eyes of the driver is and smaller the lower the position of the eyes of the driver is; and
        display the determined interest area in the determined projection area on the head-up display.

2. The vehicle of claim 1, wherein the controller is configured to determine a size of the interest area in proportion to the size of the projection area.

3. The vehicle of claim 1, wherein the controller is configured to:
    raise a position of the interest area when the speed of the vehicle increases; and
    lower the position of the interest area when the speed of the vehicle decreases.

4. The vehicle of claim 1, wherein the controller is configured to move a position of the interest area in a steering direction of the vehicle.

5. The vehicle of claim 1, wherein the controller is configured to lower a position of the interest area as a vehicle body angle of the vehicle relative to a horizontal line increases.

6. The vehicle of claim 1, wherein the controller is configured to not display the interest area in the projection area on the head-up display when the speed of the vehicle is greater than or equal to a predetermined speed.

7. The vehicle of claim 1, wherein the controller is configured to determine that an area between a lower end portion of the windshield and the boundary line is the projection area.

8. The vehicle of claim 1, wherein the input device is provided in the windshield.

9. The vehicle of claim 1, wherein the controller is configured to:
    determine a photographing angle of the first camera based on at least one of the speed of the vehicle, a steering direction of the vehicle, or a vehicle body angle of the vehicle based on a horizontal line; and
    adjust the photographing angle of the first camera based on the determined photographing angle.

10. A method for controlling a vehicle comprising:
    capturing, by a first camera, a front image of the vehicle;
    capturing, by a second camera, a face image of a driver;
    inputting a boundary line for setting an area in which an image is projected from a windshield of the vehicle;
    determining a projection area on which the image is projected based on the inputted boundary line;
    determining a position of eyes of the driver based on the face image of the driver;
    determining a size of the projection area based on the position of eyes of the driver;
    determining an interest area of the front image based on the determined projection area and a speed of the vehicle; and
    displaying the determined interest area on the determined projection area
    wherein determining the size of the projection area comprises determining the size of the projection area such that the size of the projection area is larger the higher the position of eyes of the driver is and smaller the lower the position of the eyes of the driver is.

11. The method of claim 10, wherein determining the interest area of the front image based on the determined projection area comprises determining a size of the interest area in proportion to the size of the projection area.

12. The method of claim 10, wherein determining the interest area of the front image based on the speed of the vehicle comprises:
    when the speed of the vehicle increases, raising a position of the interest area; and
    when the speed of the vehicle decreases, lowering the position of the interest area.

13. The method of claim 10, further comprising moving a position of the interest area in a steering direction of the vehicle.

14. The method of claim 10, further comprising, when a vehicle body angle of the vehicle relative to a horizontal line increases, lowering a position of the interest area.

15. The method of claim 10, further comprising, when the speed of the vehicle is greater than or equal to a predetermined speed, not displaying the interest area in the projection area.

16. The method of claim 10, wherein determining the projection area on which the image is projected based on the inputted boundary line comprises determining that an area between a lower end portion of the windshield and the boundary line is the projection area.

17. The method of claim 10, further comprising inputting, by an input device provided in the windshield of the vehicle, the boundary line for setting the area in which the image is projected from the windshield of the vehicle.

18. The method of claim 10, further comprising:
  determining a photographing angle of the first camera based on at least one of the speed of the vehicle, a steering direction of the vehicle or a vehicle body angle of the vehicle relative to a horizontal line; and
  adjusting the photographing angle of the first camera based on the determined photographing angle.

\* \* \* \* \*